United States Patent
Zhang et al.

(10) Patent No.: US 8,312,204 B2
(45) Date of Patent: Nov. 13, 2012

(54) SYSTEM AND METHOD FOR WEAR LEVELING IN A DATA STORAGE DEVICE

(75) Inventors: Fumin Zhang, Eden Prairie, MN (US); Chris Malakapalli, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 884 days.

(21) Appl. No.: 12/358,319

(22) Filed: Jan. 23, 2009

(65) Prior Publication Data

US 2010/0191897 A1    Jul. 29, 2010

(51) Int. Cl.
G06F 12/02 (2006.01)

(52) U.S. Cl. ............... 711/103; 711/217; 711/E12.002

(58) Field of Classification Search .......... 711/103, 711/218, E12.001, 217, E12.008
See application file for complete search history.

(56) References Cited

U.S. PATENT DOCUMENTS

| | | | |
|---|---|---|---|
| 5,479,638 A | 12/1995 | Assar et al. | |
| 5,797,022 A * | 8/1998 | Shimotono et al. | 713/323 |
| 5,956,473 A | 9/1999 | Ma et al. | |
| 6,016,275 A | 1/2000 | Han | |
| 6,282,605 B1 | 8/2001 | Moore | |
| 6,732,221 B2 | 5/2004 | Ban | |
| 6,850,443 B2 | 2/2005 | Lofgren et al. | |
| 7,340,581 B2 | 3/2008 | Gorobets et al. | |
| 7,525,745 B2 * | 4/2009 | Nitta | 360/31 |
| 2003/0163633 A1 | 8/2003 | Aasheim et al. | |
| 2006/0106972 A1 | 5/2006 | Gorobets et al. | |
| 2007/0050535 A1 | 3/2007 | Nelson | |
| 2007/0198796 A1 | 8/2007 | Warren | |
| 2007/0245064 A1 | 10/2007 | Liu | |
| 2008/0086470 A1 | 4/2008 | Graefe | |
| 2008/0162795 A1 * | 7/2008 | Hsieh et al. | 711/103 |

OTHER PUBLICATIONS

Wu, Chin-Hsien; Chang, Li-Pin; and Kuo, Tei-Wei; "An Efficient B-Tree Layer for Flash-Memory Storage Systems," 2004, pp. 1-20.

* cited by examiner

Primary Examiner — Pierre-Michel Bataille
(74) Attorney, Agent, or Firm — Cesari & Reed, LLP; Kirk A. Cesari (57) ABSTRACT

The present disclosure provides a system and method for wear leveling. In one example, the method includes receiving first data to be stored to a first data storage medium and storing the first data to a first storage location in a nonvolatile data store of a second data storage medium comprising a solid-state memory. The method also includes setting a pointer to enable writing second data that is received to a next storage location in the nonvolatile data store. The next storage location comprises an address of the nonvolatile data store that is sequentially after an address of the first storage location. When the address of the first storage location is a last addressed location of the nonvolatile data store the pointer is set to enable writing the second data to a first addressed location of the nonvolatile data store. The method also includes writing the first data stored in the nonvolatile data store to the first data storage medium when a trigger occurs and preserving the pointer during the writing from the nonvolatile data store to the first data storage device such that the pointer enables writing the second data to the next storage location.

20 Claims, 11 Drawing Sheets

SYSTEM AND METHOD FOR WEAR LEVELING IN A DATA STORAGE DEVICE

BACKGROUND

The present disclosure relates generally to data storage systems, and more specifically, but not by limitation, to wear leveling of components in a data storage system.

There are many types of data storage components that can be utilized in data storage systems. In many instances, the particular physical structure and configuration of the data storage components include memory locations that are susceptible to degradation. For example, in some cases a data storage component is limited by a maximum number of write, read and/or erase cycles that the storage component can perform.

The discussion above is merely provided for general background information and is not intended to be used as an aid in determining the scope of the claimed subject matter.

SUMMARY

The present disclosure provides a system and method for wear leveling. In one exemplary embodiment, a method is provided and includes receiving first data to be stored to a first data storage medium and storing the first data to a first storage location in a nonvolatile data store of a second data storage medium comprising a solid-state memory. The method also includes setting a pointer to enable writing second data that is received to a next storage location in the nonvolatile data store. The next storage location comprises an address of the nonvolatile data store that is sequentially after an address of the first storage location. When the address of the first storage location is a last addressed location of the nonvolatile data store the pointer is set to enable writing the second data to a first addressed location of the nonvolatile data store. The method also includes writing the first data stored in the nonvolatile data store to the first data storage medium when a trigger occurs and preserving the pointer during the writing from the nonvolatile data store to the first data storage device such that the pointer enables writing the second data to the next storage location.

In another exemplary embodiment, a data storage system is provided and includes a data storage medium and a nonvolatile data store comprising solid-state memory having a plurality of storage locations addressed as a circular buffer. The system also includes a controller configured to write data to sequential addresses in the circular buffer. The controller stores a first portion of data to a first storage location in the circular buffer and sets a pointer to enable writing a second portion of data that is received to a next storage location in the circular buffer. The controller determines if an amount of data stored in the circular buffer is above a threshold and, in response, flushes the amount of data from a set of storage locations in the circular buffer. The controller preserves the pointer when the amount of data is flushed such that a next portion of data is stored to addresses in the circular buffer that are sequentially after the set of storage locations from which the amount of data was flushed.

In another exemplary embodiment, a controller for a data storage system is provided and includes a first interface for writing data to a first data storage device and a second interface for writing data to a second data storage device comprising a solid-state nonvolatile data store. The controller also includes a wear-leveling component configured to store a first portion of data to a first storage location in the nonvolatile data store and set a pointer to enable writing a second portion of data to a next storage location in the nonvolatile data store. The next storage location comprises an address of the nonvolatile data store that is sequentially after an address of the first storage location. When the address of the first storage location is a last addressed location of the nonvolatile data store, the pointer is set to enable writing the second data to a first addressed location of the nonvolatile data store. The wear-leveling component is configured to flush the first portion of data stored in the nonvolatile data store to the first data storage medium when a trigger occurs and preserve the pointer during the flush from the nonvolatile data store to the first data storage device such that the pointer enables writing the second data to the next storage location.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

There are many types of data storage components that can be utilized in data storage systems. In many instances, the particular physical structure and configuration of the data storage components include memory locations that are susceptible to degradation. For example, in some cases a data storage component is limited by a maximum number of write, read and/or erase cycles that the storage component can perform.

Examples of components that can be utilized in data storage systems and can be susceptible to degradation over time include, but are not limited to, hard discs, floppy discs, magnetic discs, optical discs, magnetic tapes, and/or solid-state storage components such as semiconductor-based storage devices and the like. Solid-state storage components typically do not have moving parts and can include volatile and/or non-volatile memory. Volatile memory devices require power to maintain the stored information. Examples of volatile memory include certain types of random access memory (RAM), including dynamic random access memory (DRAM) and static random access memory (SRAM). On the other hand, non-volatile memory includes memory that can retain stored information even when not powered and includes, but is not limited to, read-only memory (ROM), electrically erasable programmable read-only memory (EEPROM), flash memory, and non-volatile random access memory (NVRAM), to name a few.

Although solid-state components, in particular non-volatile solid-state devices such as flash memory devices and the like, are being used more frequently in applications to store data, there are also a number of disadvantages to using flash memory devices and other similar non-volatile components. For instance, flash memory is especially susceptible to degradation as it is common for flash memory to have wear-out mechanisms within their physical structures. In particular, data storage locations within flash memory can experience failure after a cumulative number of erase and/or write cycles. In one example, data is erased in blocks that have a limited number of erase cycles (e.g., 10,000, 100,000, 1,000,000, etc.).

The present disclosure provides systems and methods for wear leveling of data storage components in a data storage system. Wear leveling in data storage components (such as flash memory and other similar data storage devices that are susceptible to degradation) distributes data operations across storage locations in the memory to reduce the possibility that individual storage locations will prematurely fail due to excessive erase and/or write cycles. While the present disclosure describes various concepts with respect to non-volatile memory, in particular flash memory, it is noted that the concepts described herein can also be applied to other types, formats, and configurations of data storage that is susceptible to degradation including, but not limited to, volatile memory, hard discs, floppy discs, magnetic discs, optical discs, magnetic tapes, and/or other forms of solid-state storage components.

Figure 1:
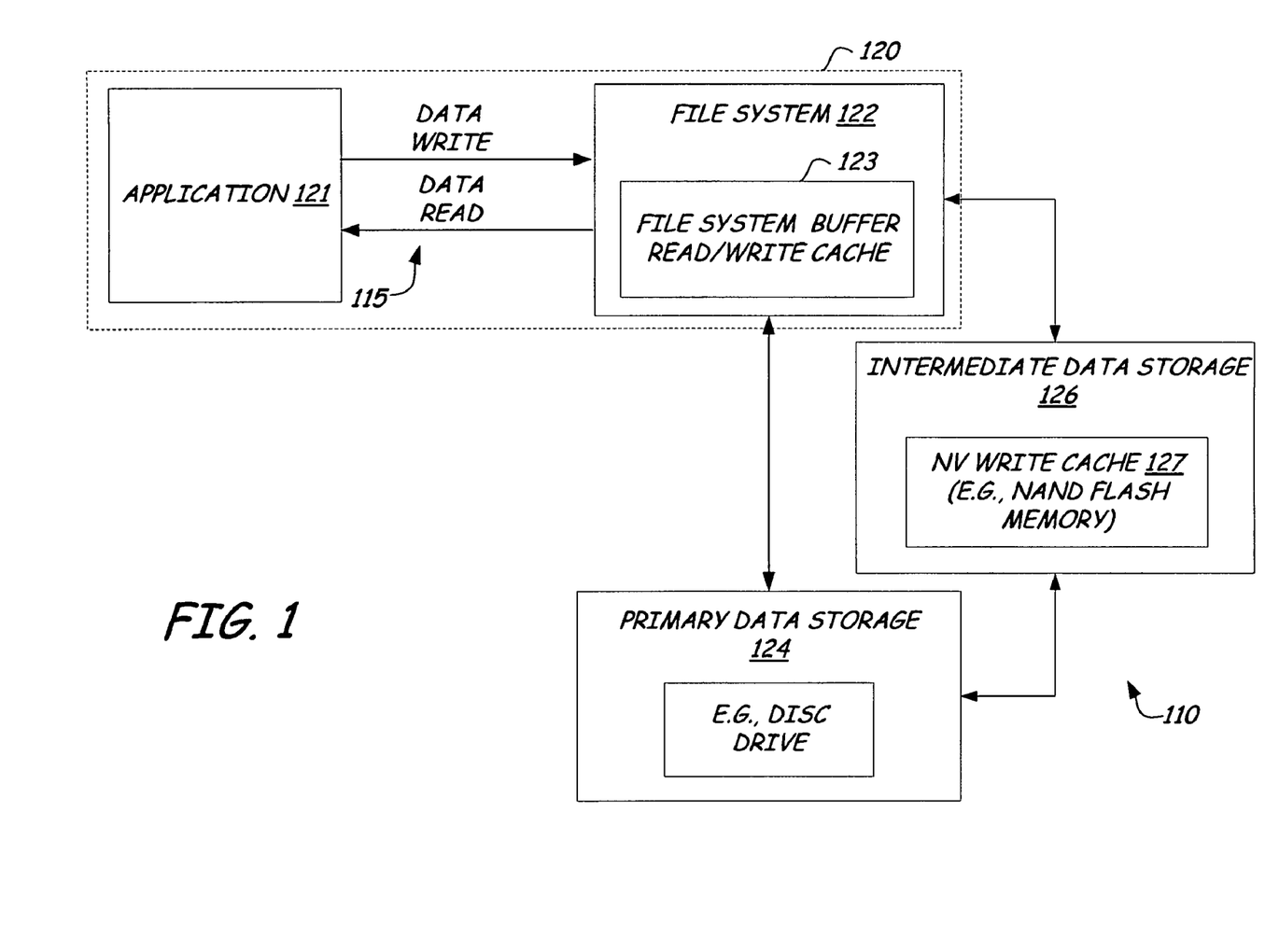
FIG. 1 is a schematic diagram of an exemplary data storage system including at least one data storage component.

FIG. 1 is a schematic diagram of an exemplary data storage system 110 including at least one data storage component. In the illustrated embodiment, data storage system 110 is communicatively coupled to a host system (or application) 120. Host system 120 can include any device, component, system, sub-system, application, or the like, that communicates (e.g., sends, receives, accesses, requests, processes data) with data storage system 110. In one example, host system 120 comprises a computing device such as, but not limited to, a personal computer, laptop computer, portable electronic device, mobile device, digital music player, mobile phone, personal digital assistant (PDA), to name a few. It is noted that data storage system 110 can be included within or can be, external to host system 120.

As illustrated in FIG. 1, host system 120 includes an application 121 that communicates with a file system 122 through a data channel 115. Examples of application 121 include data processing applications (e.g., Microsoft® Word Microsoft® Excel, WordPerfect, etc.), and web browsers, to name a few. File system 122 is configured to access, control, and/or process data associated with the one or more data storage components in data storage system 110. Further, file system 122 can also include components 123 that are configured to buffer and/or cache data associated with host system 120. For example, file system 122 includes components associated with an operating system, such as Microsoft® Windows, Linux, and the like. Examples of file system 122 include, but are not limited to, File Allocation Table (FAT), New Technology File System (NTFS), Hierarchical File System (HFS), Universal Disk Format (UDF), Journaling Flash File System (JFFS), and Yet Another Flash File System (YAFFS), to name a few.

As illustrated in FIG. 1, data storage system 110 includes a first data storage component 124 and a second data storage component 126. In the illustrated embodiment, data storage component 124 is configured for persistent or long-term data storage and includes data storage devices such as, but not limited to, a disc drive having one or more data storage discs. However, it is noted that in other embodiments data storage component 124 can include any suitable type of memory component(s) such as other forms of non-volatile memory as well as volatile memory. Examples include, but are not limited to, floppy discs, magnetic discs, optical discs, magnetic tapes, and solid-state storage components, to name a few.

Data storage component 126 is illustratively configured for intermediate data storage. For example, data storage component 126 comprises a data buffer and/or data cache that temporarily stores data within data storage system 110. In one instance, data storage component is configured to buffer data to be written to the data storage component 124.

In the illustrated embodiment, data storage component 126 comprises a non-volatile (NV) write cache 127 that includes flash memory (e.g., NAND flash memory). While NV write cache 127 is described herein with respect to flash memory, it is noted that in other embodiments data storage component 126 can include other forms of non-volatile memory, as well as volatile memory. Examples include hard discs, floppy discs, magnetic discs, optical discs, magnetic tapes, electrically erasable programmable read-only memory (EEPROM), non-volatile random access memory (NVRAM), and other forms of solid-state storage components, to name a few.

During a data write operation, file system 122 is configured to receive a portion of data from application 121 and write the portion of data to one or more of data storage components 124 and 126. In one example, file system 122 receives data to be stored to data storage component 124. Before storing the data to component 124, file system 122 provides the data to intermediate data storage component 126 to buffer the data in the NV write cache 127. The data stored in intermediate data store 126 is subsequently transferred to data storage component 124.

During a data read operation, file system 122 receives a data access request from application 121 and identifies location(s) in the data storage system 110 that contain the requested data. For instance, file system 122 accesses either, or both, data storage components 124 and 126 to retrieve the requested data.

To perform data operations with data storage system 110, host system 120 operates on logical block addresses (LBAs) that identify the data within the host system (or logical) space. In other words, the logical block address (LBA) is the address that the host system 120 uses to read or write a block of data to data storage system 110. For example, the host system 120 implements a write command of data identified by an LBA=1000. In this manner, the host system associates the portion of data to be written with the logical address (LBA) 1000. When the data is stored to data storage system 110, for example in NV write cache 127, the LBA associated with the data (i.e., LBA=1000) is mapped to the physical block address(es) (PBAs) in the NV write cache 127 where the data is stored. This logical-to-physical address mapping is important because the LBAs in the logical space are often not contiguous while the PBAs associated with the storage medium are often contiguous. This logical-to-physical address mapping information is stored in a translation/mapping component (not illustrated in FIG. 1). For instance, a translation/mapping component can be associated with file system 122 and/or either (or both) of storage components 124 and 126.

In one particular example, flash memory and other similar data storage devices utilize a file system (e.g., flash file system) or translation layer (e.g., flash translation layer) to manage data operations. To store, retrieve, and/or access data in the data storage device, host commands are generally issued to the data storage device using a logical block convention which includes a logical address associated with the host device (i.e., logical space). A translation table carries out a conversion of the logical block address (LBA) to locate the associated physical blocks (e.g., sectors, pages, blocks) within the data storage system. Data access, write, read, and/or erase operations are performed on memory locations in the data storage system based on the physical address.

Figure 2:
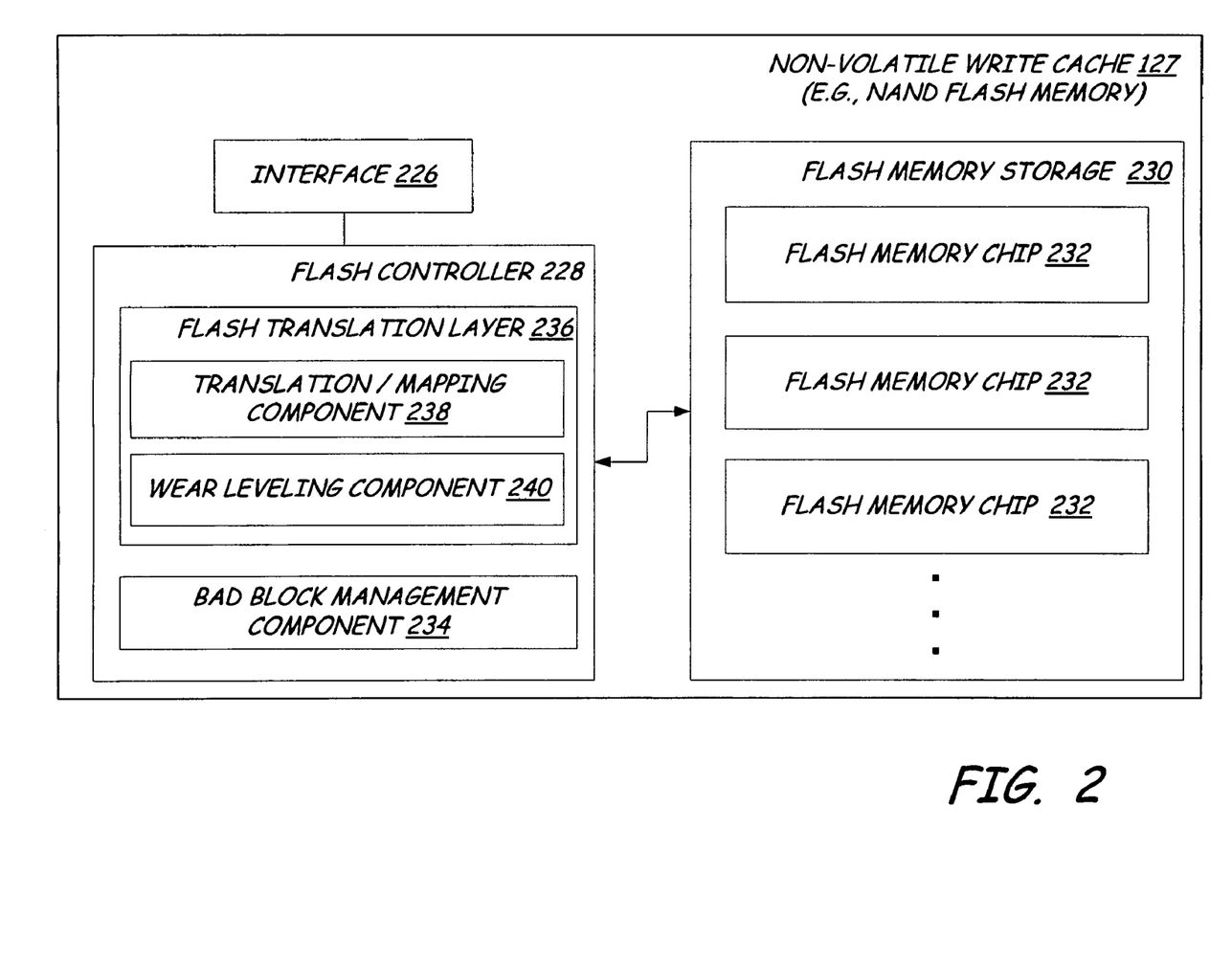
FIG. 2 is a schematic diagram of a data storage component, under one embodiment.

FIG. 2 is a schematic diagram of the NV write cache 127 illustrated in FIG. 1. NV write cache 127 includes an interface 226 that is configured to send and receive data between components within data storage system 110. A controller 228 receives data through interface 226 and stores the data within a flash memory storage component 230. Flash memory storage 230 can include one or more flash memory chips 232 that form a plurality of addressable storage locations. Flash memory storage 230 illustratively includes NAND flash memory. However, it is noted that flash memory storage 230 can include NOR flash memory, as well as other types of storage devices such as those discussed above.

Figure 3:
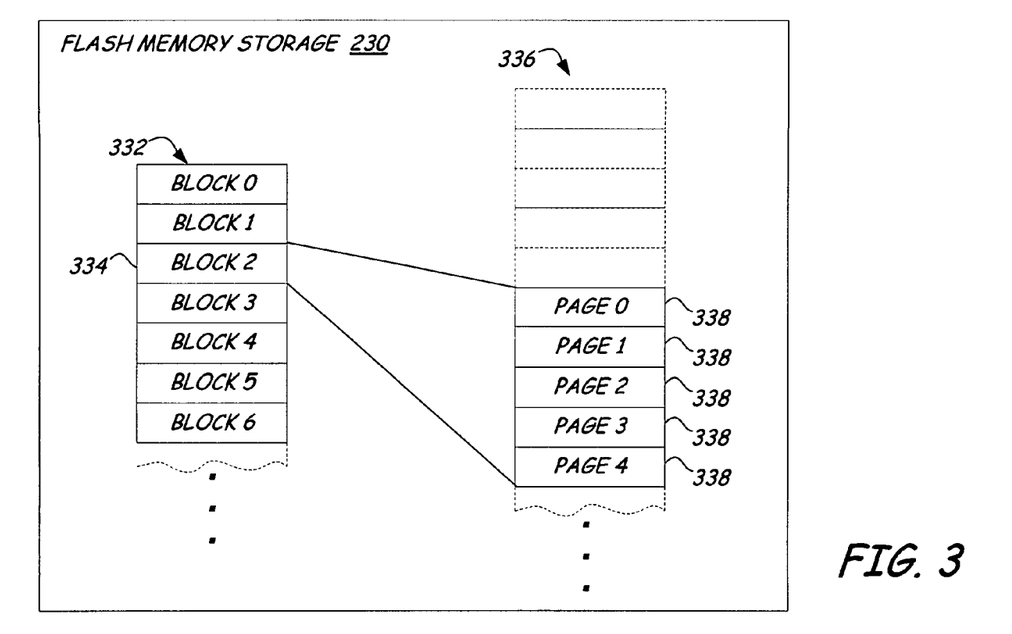
FIG. 3 illustrates storage locations within an exemplary flash memory storage component.

FIG. 3 illustrates storage locations within flash memory storage 230, in one embodiment. Flash memory storage 230 includes a plurality of blocks 332 that are divided into a plurality of pages (or sectors) 336. As illustrated in FIG. 3, an exemplary block 334 includes a plurality of pages 338. In NAND flash devices, for example, the memory space is typically divided into blocks that include 32 pages that each comprise 512 bytes (B) of storage. Thus, a typical block size in a NAND flash device is 16 kilobytes (kB). However, it is noted that flash memory storage 230 can be divided into blocks and pages having any desired size and configuration. For instance, pages 336 can be 2,048 or 4,096 bytes in size. Further, in NAND flash memory programming is performed on a page basis while erase operations are performed on a block basis.

Figure 4:
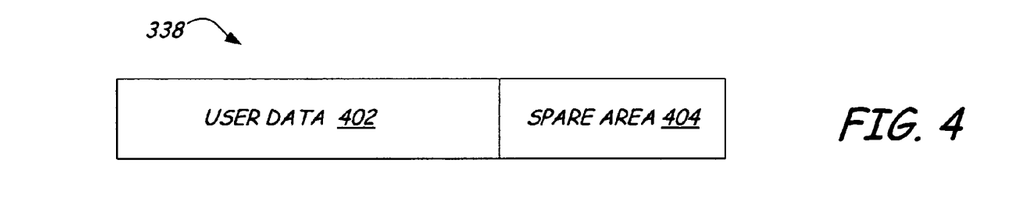
FIG. 4 illustrates one embodiment of a storage location within the flash memory storage component of FIG. 3.

FIG. 4 illustrates an exemplary page (or sector) 338 within flash memory storage component 230. Page 338 includes a user data region 402 for storing user data and a spare region 404 that is configured to store additional data pertaining to the user data. For example, spare region 404 can include error correction code (ECC) and/or an identifier that indicates logical block address(es) associated with the user data stored in the user data region 402.

Referring again to FIG. 2, a flash translation layer 236 is provided for addressing storage locations in flash memory storage 230 and a bad block management (BBM) component 234 is provided for maintaining a record of storage locations (e.g., blocks, pages, etc.) within flash memory storage 230 that contain one or more invalid bits whose reliability cannot be guaranteed. "Bad" blocks can be present when the memory device is manufactured or can develop during the lifetime of the memory device. The BBM component 234 can be integrated with, or separate from, the flash translation layer 236.

In one embodiment, BBM component 234 creates a bad block table by reading areas in the flash memory storage 230. The table is stored, for example, in a spare area of the flash memory storage 230 and can be loaded into RAM upon booting of the flash memory storage 230. The blocks that are contained in the bad block table are not addressable. As such, if the flash translation layer 236 addresses one of the bad blocks identified by the bad block table, the BBM component 234 redirects the operation and re-maps the block address by allocating a new or spare block in flash memory storage 230.

Bad blocks can be determined in any of a number of ways. For example, a Status Register can be maintained that indicates whether an operation (i.e., a programming operation, a erase operation) is successful. A threshold number of unsuccessful operations can be used to indicate that a block should be marked as "bad" in the bad block table. Alternatively, or in addition, an Error Correction Code (ECC) algorithm can be employed to determine if a block contains a threshold number of uncorrectable errors and should be placed in the bad block table.

When a logical sector of data (i.e., a portion of data from host system 120 having an associated logical block address (LBA)) is to be written to the flash memory storage 230, the flash translation layer 236 identifies the physical address of the physical block to which the data will be written. The logical block address (LBA) is the address that the host system 120 uses to read or write a block of data to data storage system 110. The physical block address is the fixed, physical address of a block in the storage component. The flash translation layer 236 stores a mapping of the logical addresses to the corresponding physical addresses in a translation/mapping component 238. The mapping information stored in component 238 is utilized for subsequent data access operations to locate requested data in flash memory storage 230.

Before the data is written to flash memory storage 230, the bad block management component 234 determines whether the block identified by the physical address is contained in the bad block table and is thus characterized as unreliable or unusable. If the block is contained in the bad block table, the bad block management component 234 re-maps the logical sector to a spare ("good") block in the flash memory storage 230. In one embodiment, the bad block management component 234 is transparent to, and operates independently from, the flash translation layer 236.

Figure 5:
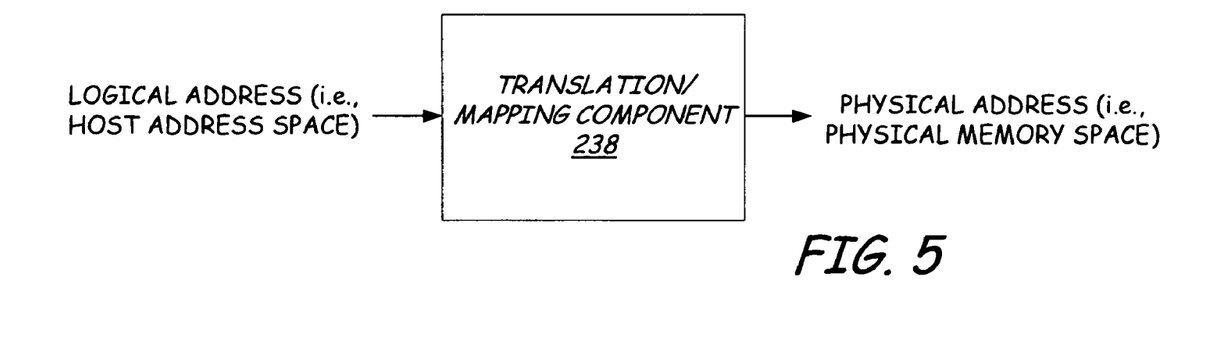
FIG. 5 is a schematic diagram of a component for mapping logical addresses to physical addresses.

FIG. 5 illustrates translation/mapping component 238 in greater detail. As shown in FIG. 5, component 238 is configured to receive a logical address (or addresses) as an input and identify the corresponding physical address (or addresses). For example, when host system 120 issues a read command for logical address 1000 (i.e., LBA=1000), translation/mapping component 238 identifies the physical address(es) in the data storage component where the requested data is stored.

Figure 6:
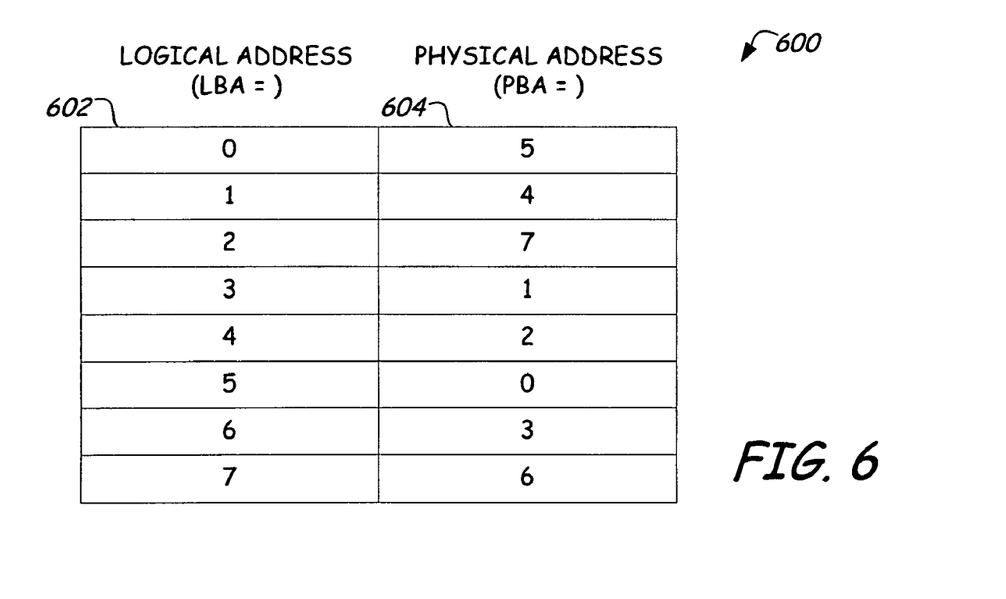
FIG. 6 illustrates a table including translation information for use by the component of FIG. 5, under one embodiment.

Translation/mapping component 238 can include any suitable data structure for storing the logical-to-physical address mapping information. For example, FIG. 6 illustrates a translation mapping table 600 that includes a plurality of logical addresses provided in a first column 602 and their corresponding physical addresses stored in a second column 604.

Figure 7:
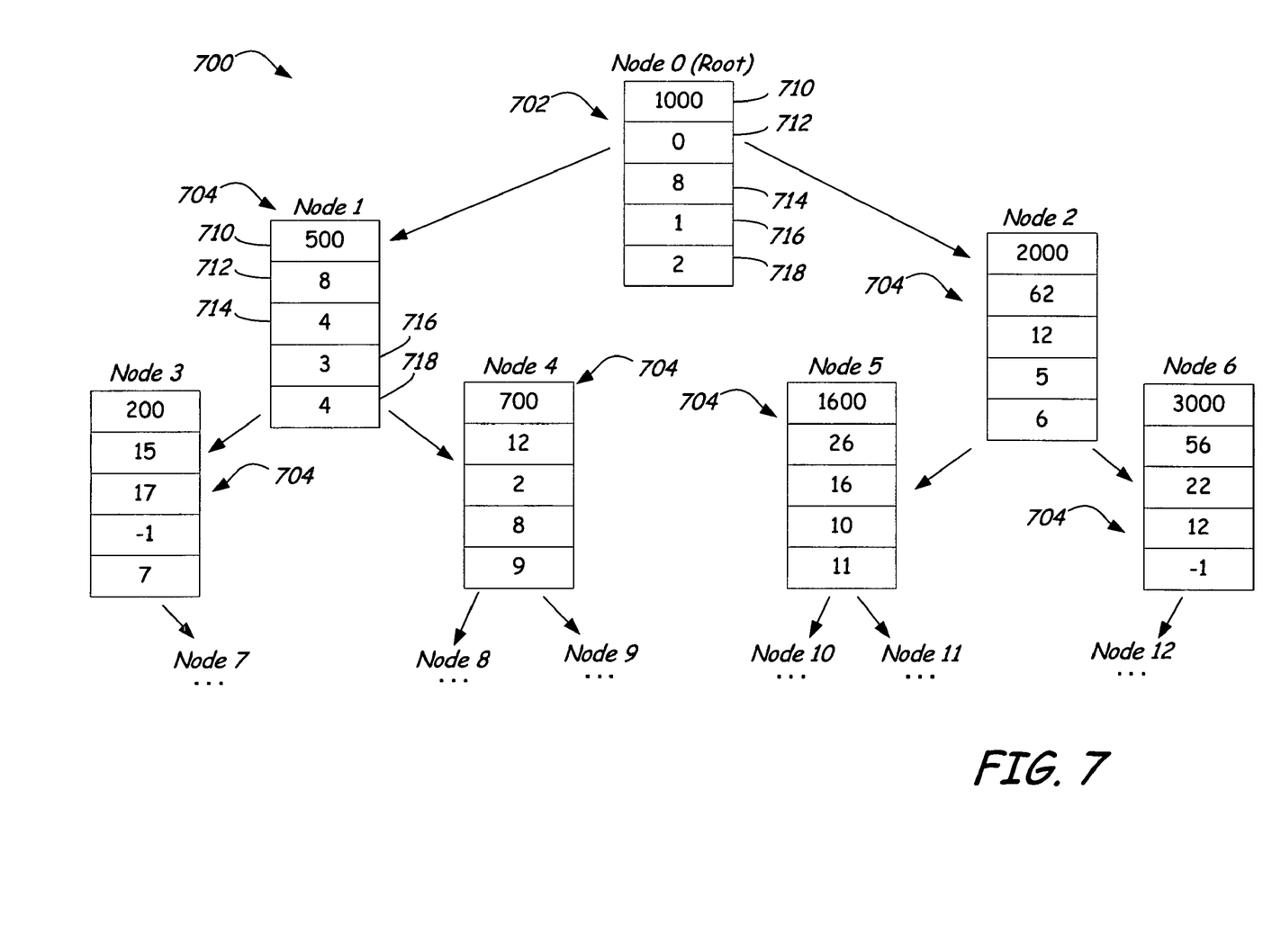
FIG. 7 illustrates a tree structure including translation information for use by the component of FIG. 5, under one embodiment.

Alternatively, or in addition, translation/mapping component 238 can include other data structures, such as a tree structure. FIG. 7 illustrates an exemplary tree structure 700 that includes logical-to-physical address mapping information. Structure 700 includes a plurality of nodes (illustratively Nodes 0-12) that each pertains to one or more logical addresses. The plurality of nodes includes a root node 702 (Node 0) and a number of child nodes 704 (Nodes 1-12). It is noted that the configuration of tree structure 700 illustrated in FIG. 7 is exemplary and provided for illustration purposes. Structure 700 can include any number and configuration of nodes as desired for a particular application.

Each node in tree structure 700 includes a plurality of data relating to the logical-to-physical address mapping information. For instance, as illustrated each node comprises a first field 710 that identifies the logical address (or addresses) and a second field 712 that identifies the corresponding physical address (or addresses) that is mapped to the logical address(es) in field 710. The addresses stored in fields 710 and/or 712 include information such as block and/or page numbers. Additionally, the nodes include a third field 714 that identifies the number of pages (or sectors) that the stored information utilizes. To illustrated, with reference to node 702 the logical address 1000 is mapped to physical address 0. The data associated with logical address 1000 comprises 8 pages (or sectors) of information that are stored beginning at physical address 0.

To retrieve the desired logical-to-physical address mapping information from the tree structure 700, translation/mapping component 238 traverses the nodes in tree structure 700 until the node representing the desired logical address stored in field 710 is encountered. To facilitate tree traversal, each node also includes index information stored in fields 716 and 718. The index information stored in fields 716 and 718 point to one or more child nodes of the current node in the tree structure. Field 716 is a left index pointer that identifies the child node to the left of the current node and field 718 is a right index pointer that identifies the child node to the right of the current node. In the illustrated embodiment, the left index pointers 716 point to the child node having an LBA that is numerically less than the current node and the right index pointers 718 point to the child node having an LOA that is numerically greater than the current node. For instance, with reference to Node 1 the index pointer stored in field 716 indicates that Node 3 is the child node to the left of Node 1 and represents an LBA (i.e., LBA=200) that is numerically less than the LBA represented by Node 1 (i.e., LBA=500). Further, the index pointer stored in field 718 indicates that Node 4 represents an LBA (i.e., LBA=700) that is numerically greater than the LBA represented by Node 1 (i.e., LBA=500). If there is no child node to the left and/or right of the current node, the corresponding fields 716 and/or 718 store a "−1", or some other identifier.

Tree structure 700 is traversed to find a desired address many of a number of ways. In one example, component 238 begins at root node 702. If the root node 702 does not include the desired logical address, the index fields 716 and 718 are utilized to determine which branch in the tree should be followed. For example, if component 238 is attempting to locate logical block address 700 (LBA=700) component 238 determines that the LBA address 700 has a numeric value that is less than 1000 (the LBA of the root node). Component 238 follows the left index pointer to Node 1 and subsequently determines that the desired logical address (i.e., LBA=700) is greater than the LBA represented by Node 1. Component 238 then follows the right index point to Node 4, which includes the mapping information for the desired LBA (LBA=700).

Referring again to FIG. 2, in the illustrated embodiment flash translation layer 236 also includes a wear leveling component 240 that is configured to distribute data operations across blocks in flash memory storage 230 to prolong the service life of flash memory storage 230. Typically, blocks within flash memory have a limited number of erase cycles (e.g., 10,000, 100,000, etc.) after which the blocks become unusable or unreliable for storing information. Wear leveling component 240 attempts to work around these limitations by arranging data so that erasures and re-writes are distributed evenly (or at least substantially evenly) across the storage locations in flash memory storage component 230. In this manner, wear leveling component 240 reduces, or prevents, individual blocks in the flash memory from prematurely failing due to a high concentration of write and/or erase cycles.

Figure 8:
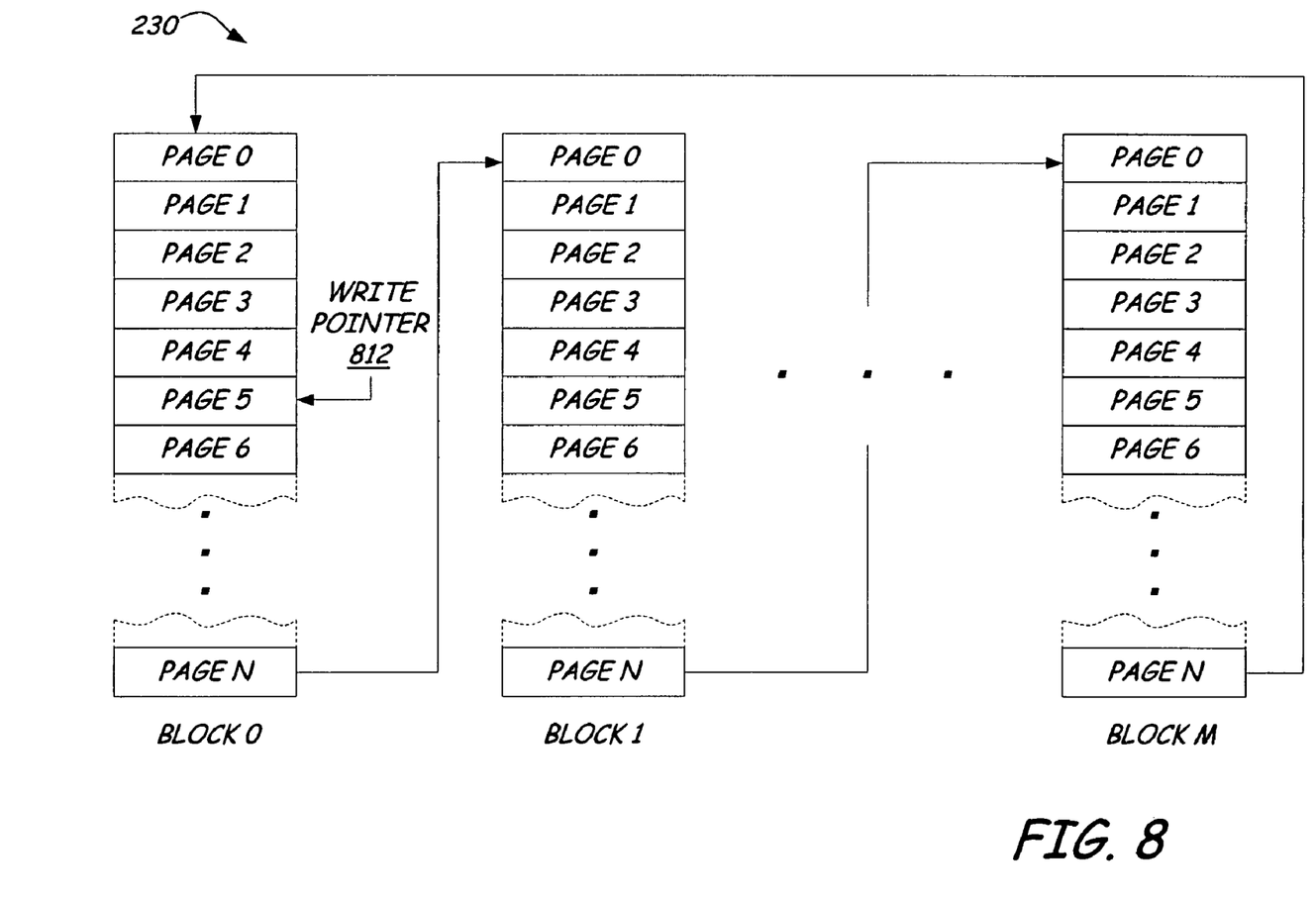
FIG. 8 is a schematic diagram of storage locations in a data storage component that are addressed as a circular buffer, under one embodiment.

In accordance with one embodiment, wear leveling component 240 is configured to distribute write operations across storage locations in flash memory storage 230 by addressing the storage locations in flash memory storage 230 as a circular buffer. In this manner, each individual storage location (e.g., pages, blocks, sectors) in flash memory storage 230 will receive the same, or substantially the same, amount of write operations over a period of time. FIG. 8 illustrates one exemplary embodiment of flash memory storage 230 in which the storage locations are addressed to store data as a circular buffer. As illustrated in FIG. 8, flash memory storage 230 includes a plurality of blocks (i.e., "M" blocks), each block including a plurality of pages (or sectors) (i.e., "N" pages). However, it is noted that flash memory storage 230 can include any number of blocks that are divided into any number of pages. Each block can include the same number or a different number of pages.

As illustrated in FIG. 8, a write pointer 812 is maintained that identifies the next page or sector in memory 230 to which data is to be written. In the illustrated example, the next portion of data to be written to flash memory storage 230 is stored beginning at Page 5 of Block 0.

After data is written to the last page of the last block (i.e., Page N of Block M), the write pointer returns to the beginning of the storage locations (i.e., Page 0, Block 0). By addressing flash memory storage 230 as a circular buffer, data is written in flash memory component 230 in a sequential manner such that wear leveling is achieved and individual counts identifying a number of write and/or erase cycles for each page are not required.

Figure 9:
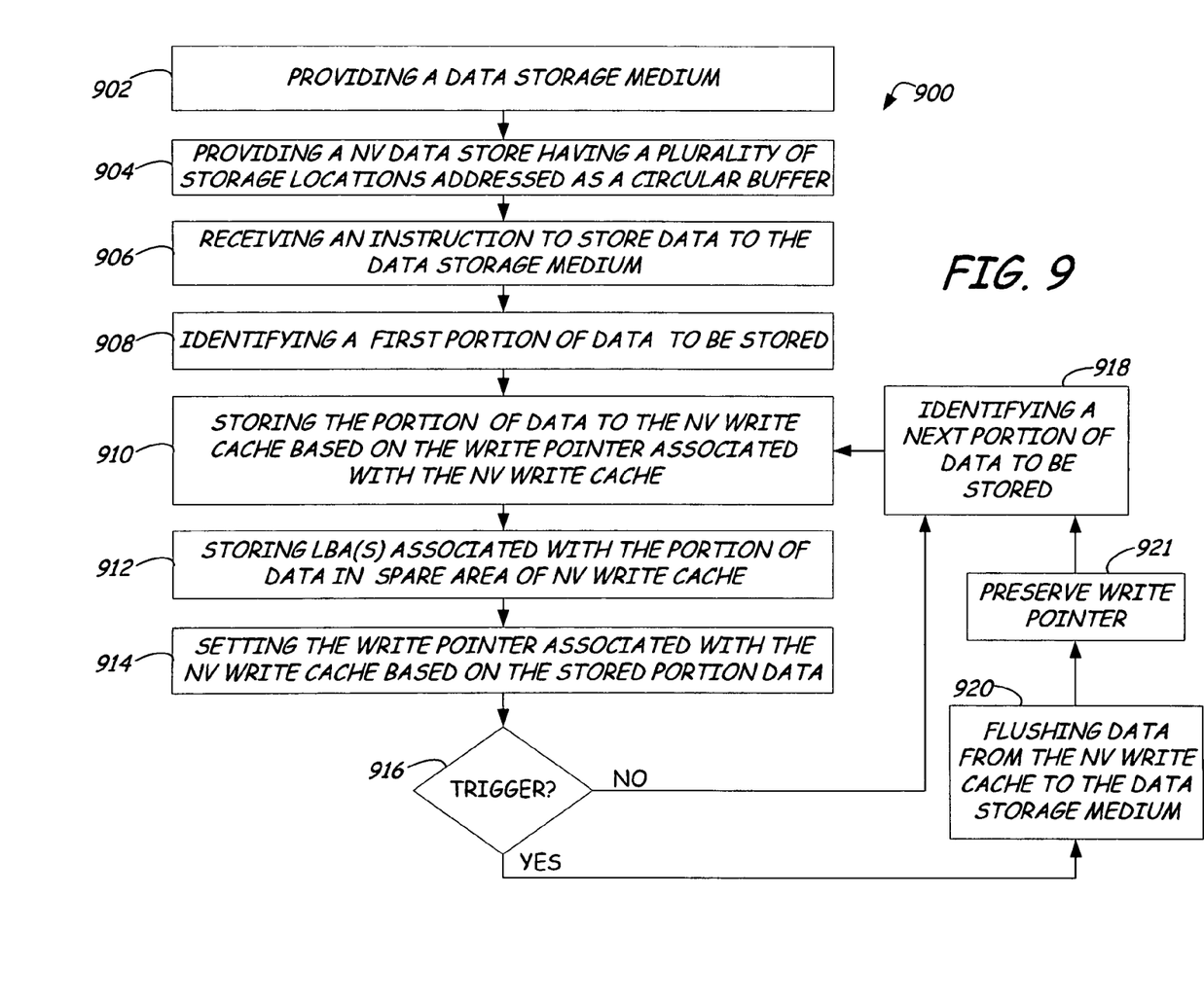
FIG. 9 is a flow diagram of a method for wear leveling in a data storage system.

FIG. 9 illustrates a method 900 for performing wear leveling in a data storage system, such as system 110 illustrated in FIG. 1. In one embodiment, one or more of the steps of method 900 are implemented by file system 122 and/or flash controller 228 of NV write cache 127 (for instance, wear leveling component 240). Method 900 is described below with respect to FIG. 1 for illustration and is not intended to limit the scope of the concepts described herein.

Method 900 includes steps 902 and 904 that include providing a data storage medium (e.g., a first data storage component 124) and a non-volatile data store (e.g., a second data storage component 126 including NV write cache 127), respectively. The data storage medium provided at step 902 is illustratively configured for persistent and/or long-term data storage and the NV data store provided at step 904 is illustratively configured for intermediate data storage. The NV data store provided at step 904 includes a plurality of storage locations that are addressed as a circular buffer. In the illustrated embodiment, the NV data store includes flash memory 230 having a plurality of blocks divided into a plurality of pages, as shown in FIG. 8.

At step 906, an instruction is received to store data to the first data storage medium 124. The data to be stored to the first data storage medium 124 includes one or more logical block addresses (LBAs). A first portion of the data is identified at step 908. The first portion of the data identified at step 908 can include one or more sectors (or blocks) of data and can comprise some or all of the data received at step 906. The portion of data (in this instance the first portion of data) that is identified is referred to as the "current" portion of data. In subsequent steps, a next or subsequent portion of data identified from the data received at step 906 will also be referred to as the "current" portion of data.

At step 910, the current portion of data (in this case the first portion of data identified at step 908) is stored to the second data storage component (i.e., NV write cache 127). The current portion of data is stored to the NV write cache 127 based on a write pointer (e.g., write pointer 812) associated with the NV write cache 127. At step 912, the logical block address(es) associated with the current portion of data stored at step 910 are stored to spare area(s) in the NV write cache 127. For example, if a logical block having an LBA of 200 is stored to Page 5 of Block 1 in the NV write cache 127, the user data would be stored in the user data region of that page and the spare region of that page would be used to store an identifier that associates the LBA of 200 with the user data. This enables the translation/mapping component 238 to scan the spare areas of the NV write cache 127 to build the translation mapping information, if desired. For example, the component 238 can build the translation mapping information in the event of system start-up, power failure, etc.

After the current portion of data (i.e., the first portion) is stored at step 910, the write pointer is set to address the next storage location in the NV write cache 127. The write pointer enables writing a next portion of data (i.e., a second portion of data) that is received to the next storage location in the NV write cache 127. The next storage location comprising an address of the NV write cache 127 that is sequentially after an address where the previous portion of data is stored, for example after an address where the first portion is stored. When the address of the first storage location is a last addressed location of the NV write cache 127 the pointer is set to enable writing the next data to a first addressed location of NV write cache 127.

If desired, the write pointer can also be stored in an unused or spare area of the NV write cache 127 such that the write pointer is maintained in the event of power failure, system shut-down, etc. This operates to ensure that data is stored to the proper locations in the circular buffer in the event that power is lost to the NV write cache 127.

At step 916, the method determines whether a trigger has occurred. In response to the trigger, the method transfers some or all of the data stored in the NV write cache 127 to the first data storage 124. Examples of triggers include, but are not limited to, an indication of a quantity of data stored in the NV write cache 127, an indication of a previous time that data was written to the NV write cache 127, an indication that the pointer is set to a specific address, and/or an indication of a length of time from a previous writing of the NV write cache 127 to the first data storage medium. Further, the indication can be received from the data storage components (i.e., components 124 and/or 126) and/or from a host device.

In the illustrated example, the trigger provides an indication that an amount of data stored in the NV write cache 127 is above a threshold amount. For instance, in one example the threshold is set to a percentage of the total number of storage locations in the NV write cache 127. The percentage includes, in one embodiment, eighty percent of the storage capacity of the NV write cache 127. In this manner, step 916 determines whether the data stored in the NV write cache 127 comprises eighty percent or more of the total number of storage locations in the write cache 127. In other examples, the threshold can be greater than or less than eighty percent (for example, 50%, 75%, 90%, 100%, etc.). Further, in some embodiments step 916 determines a total number of used locations and/or a total number of remaining locations.

If step 916 determines that the amount of data is not above the threshold, the method continues to block 918 wherein a next portion (e.g., a second portion) of data, if any, is identified and steps 910-916 are repeated for the next portion of data. The next portion of data identified at step 918 become the "current" portion of data during the next iteration of steps 910-916.

If step 916 determines that the amount of data stored in the NV write cache 127 is above the threshold, the method proceeds to block 920 wherein the data stored in the NV write cache 127 is stored (e.g., "flushed") from the NV write cache 127 to the data storage medium 124. Step 920 is illustrated in further detail in FIG. 10. In one embodiment, the pointer is preserved at step 921 during the flushing of data from the NV write cache 127 to the first data storage device such that the pointer enables writing a next portion of data to a sequentially next location in the NV write cache 127.

Figure 10:
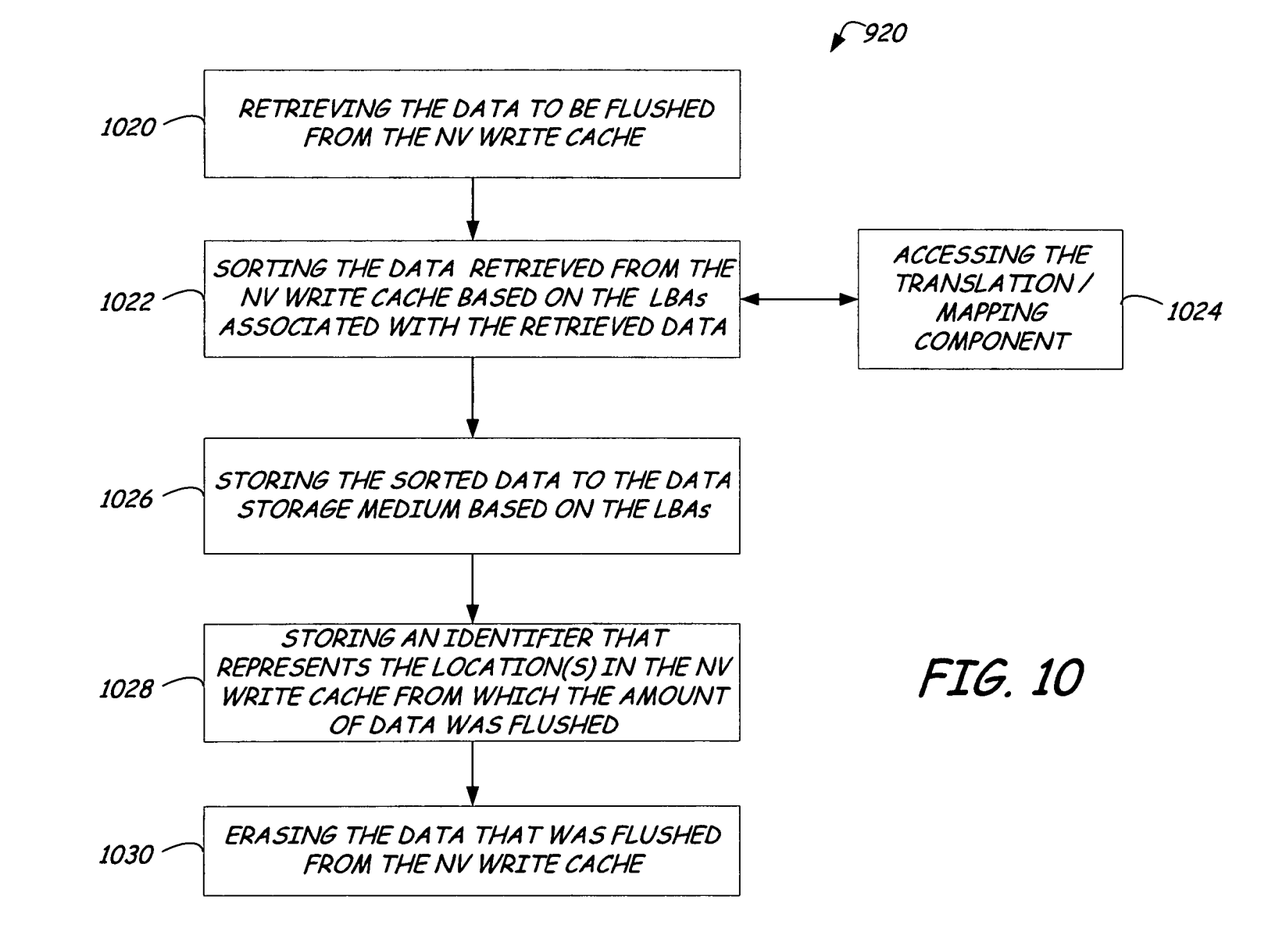
FIG. 10 is a flow diagram of a portion of the method of FIG. 9.

As illustrated in FIG. 10, at step 1020 the data to be flushed from the NV write cache 127 is retrieved. At step 1022, the method sorts the data retrieved from the NV write cache 127 based on the logical block addresses associated with the data. For instance, the method places the data in a sequential order based on the logical block addresses. Step 1022 can include accessing the translation/mapping component 238 at step 1024 to identify the logical block address based on the physical addresses of the data. Alternatively, or in addition, step 1022 can include accessing the spare regions of the pages in the NV write cache 127 to retrieve stored LBA information.

At step 1026, the sorted data is stored to the data storage medium 127 based on the logical block addresses. At step 1028, the method stores an identifier in the NV write cache 127 (for example in an unused or spare area) that identifies the storage locations in the NV write cache 127 from which the data was flushed. For instance, the identifier indicates the storage location in the NV write cache that is sequentially after the area of the NV write cache 127 that was flushed. To illustrate, with reference to FIG. 8 if the data flushed from the NV write cache 127 comprises data stored in Block 0, Page 0 to Block 1, Page 5, the method stores an identifier that identifies Block 1, Page 6 such that the method can identify where a next portion of data is to be stored. This operates to maintain the circular nature of the data operations in the NV write cache 127 and is especially advantageous in cases where the data storage system loses power, is re-booted, or upon start-up to maintain even wear leveling across all of the storage locations in the NV write cache 127.

At step 1030, the data that was flushed to the data storage medium 124 is erased from the NV write cache 127. In one example, step 1030 is performed in the background and/or while the data storage system 110 is idle such that the process of erasing the data does not significantly interfere with subsequent data operations.

Figure 11:
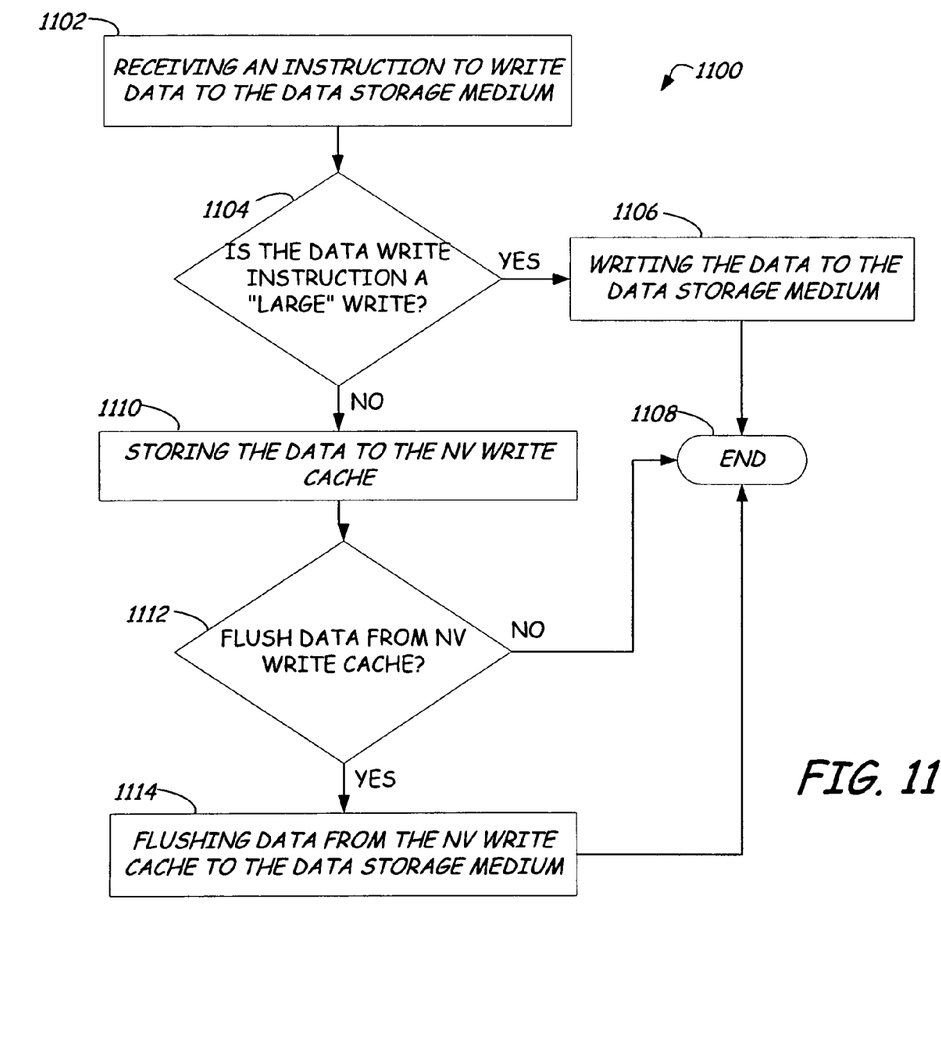
FIG. 11 is a flow diagram of a method for writing data in a data storage system.

FIG. 11 illustrates one embodiment of a method 1100 for writing data within data storage system 110 which can be implemented in addition to and/or integrated with the concepts described in method 900.

At step 1102, an instruction is received to write data to the data storage medium 124. At step 1104, the method determines if the data write instruction constitutes a "large" data write. In other words, the method identifies if the amount of data to be written to the data storage medium 124 is greater than a threshold amount. The threshold amount can be, in one embodiment, based on the storage capacity of the NV write cache 127. For example, if the amount of data to be stored is larger than a threshold percentage of the storage capacity of NV write cache 127, the write instruction is categorized as a "large" data write. Examples of a threshold percentage include, but are not limited to, 25%, 50% 75% and 100%.

If step 1104 determines that the data write is categorized as a "large" write, the method proceeds to step 1106 wherein the data (or a portion thereof) is written directly to the data storage medium 124. If the data has been stored to the data storage medium 124, the method ends at block 1108. Otherwise, any remaining portion that was not stored to medium 124 can be stored to another storage component, such as NV write cache 127.

If the data write is not categorized as a "large" write at step 1104, the method proceeds to step 1110 wherein the data is stored to NV write cache 127. Step 1112 then determines if the data stored in the NV write cache 127 should be flushed to the data storage medium 124 at step 1114. In one embodiment, steps 1112 and 1114 of method 1100 include one or more of steps 908-920 described above with respect to FIG. 9.

Figure 12:
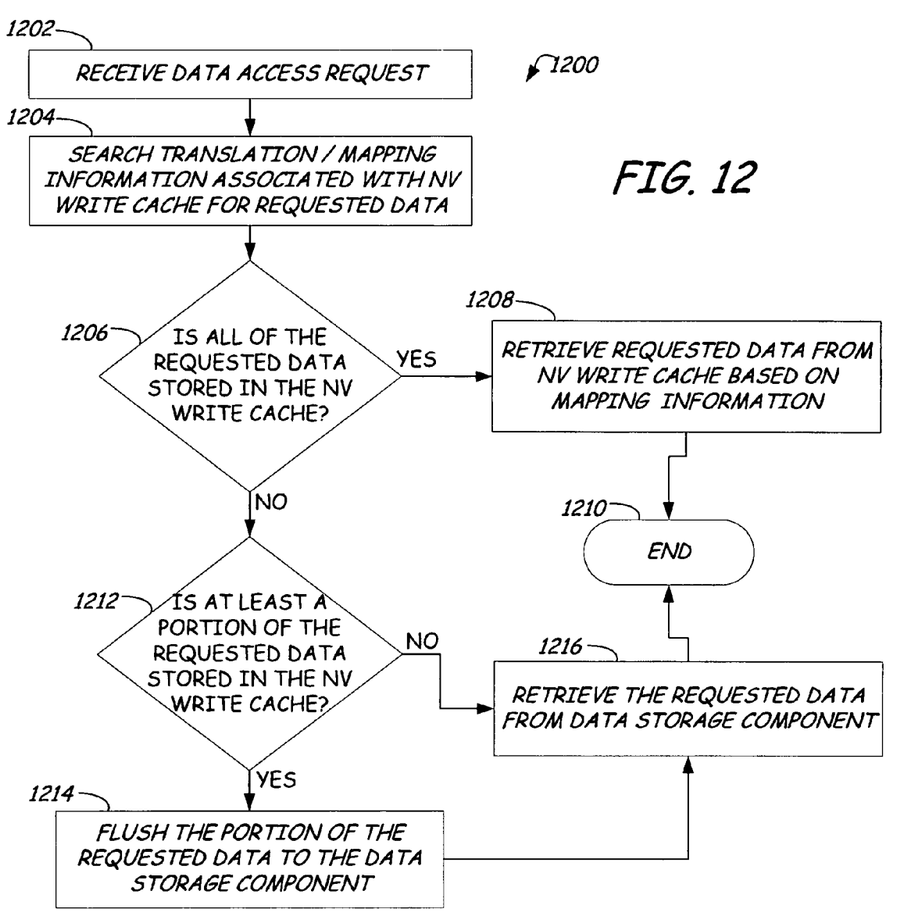
FIG. 12 is a flow diagram of a method for accessing data in a data storage system.

FIG. 12 illustrates a method 1200 for accessing data within data storage system 110. At step 1202, a data access request is received. This includes, but is not limited to, a request to read data stored in one or more storage components in system 110. At step 1204, the method searches the translation/mapping information associated with the non-volatile write cache 127. This includes accessing translation/mapping component 238 to search the logical-to-physical mapping information stored therein. As discussed above, the mapping information can be contained in a translation table, such as table 600 illustrated in FIG. 6, and/or tree structure, such as tree structure 700 illustrated in FIG. 7.

At step 1206, the method determines whether all of the requested data is stored in the NV write cache 127. If the method determines that all of the requested data is stored in the NV write cache 127 (i.e., there is a "full" read hit on the NV write cache 127), the method proceeds to step 1208 wherein the requested data is retrieved from the NV write cache 127 based on the logical-to-physical mapping information. Otherwise, the method proceeds to step 1212.

At step 1212, the method determines whether a portion of the requested data is stored in the NV write cache 127. For example, in one instance host system 120 requests 10 sectors of information from data storage system 110 but only 8 of the sectors are stored in the NV write cache 127 and the other 2 sectors are stored on the data storage component 124. In this case, the method proceeds to step 1214 wherein the portion of the requested data stored in the NV write cache 127 (e.g., the 8 sectors in the above example) is identified and flushed to the data storage component 124. Flushing the data at step 1214 can be substantially similar to step 920 illustrated in FIG. 10. After the portion of data is flushed at step 1214, the data storage component 124 is accessed to retrieve the requested information.

If the method determines at step 1212 that none of the requested information is stored in the NV write cache 127, the method proceeds to step 1216 wherein the method attempts to retrieve the data from data storage component 124 (or other storage component) in system 110.

Figure 13:
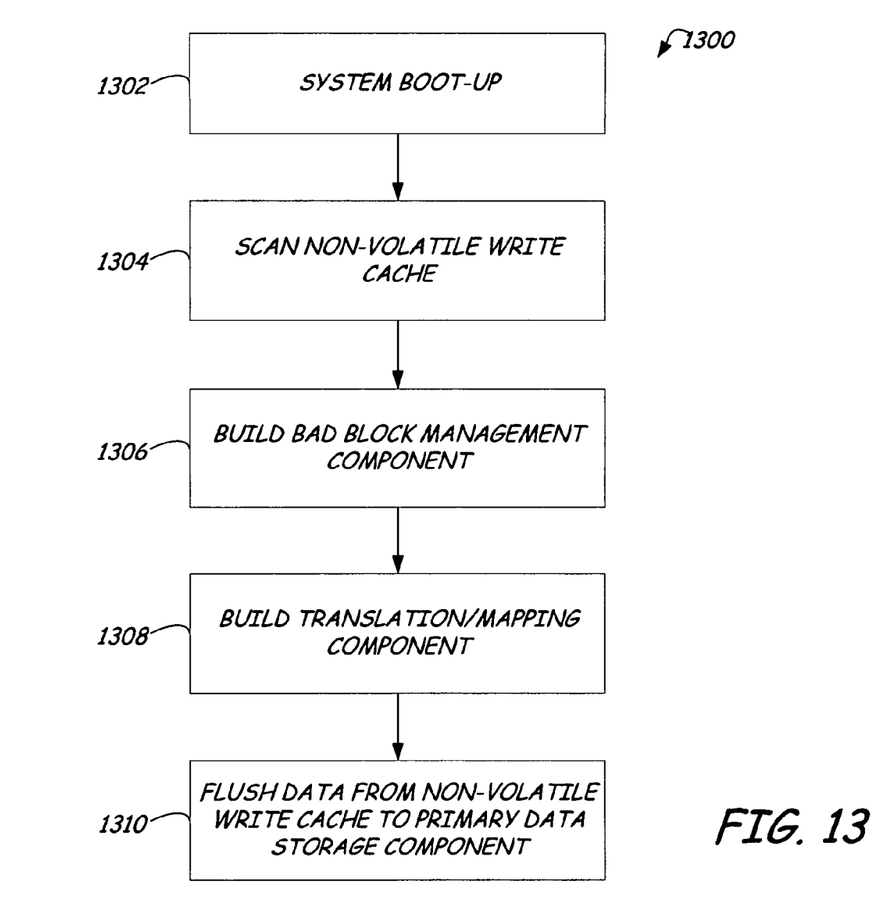
FIG. 13 is a flow diagram of a method that is implemented during boot-up of a data storage system.

FIG. 13 is a flow diagram of a method 1300 that can be implemented during start-up of data storage system 110. At step 1302, the data storage system 110 is booted. In one embodiment, the boot code is stored in flash memory, for example in NV write cache 127, for fast access to the boot code.

At step 1304, the method scans the NV write cache 127, including the spare areas, to identify and index data stored in the NV write cache 127. For instance, at step 1306 the method scans the NV write cache 127 to build the bad block management component 234. For example, method 1300 can build a bad block table by accessing a Status Register that maintains an indication of successful operations (i.e., a programming operations, a erase operations) and/or Error Correction Code (ECC) to determine if particular blocks contain a threshold number of uncorrectable errors. Alternatively, or in addition, step 1306 includes acquiring a bad block table that was previously created and stored in a spare area of the NV write cache 127.

At step 1308, the method builds the translation/mapping component 238 based on the scan of the NV write cache 127 at step 1304. For instance, in one embodiment step 1308 includes retrieving logical block address information from spare regions of pages in the NV write cache 127. As discussed above, each user data region in the NV write cache 127 can have a corresponding spare region that stores a logical block address associated with the user data stored in the user data region. The method utilizes these logical block addresses stored in the spare region to build the translation/mapping component 238.

At step 1310, after the bad block management component and translation/mapping component have been built, the data stored in the NV write cache 127 can be flushed to the data storage component 124, if desired. One or more of steps 1304-1310 can be performed in the background after boot-up and before hard-disk mounting, for example.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. A method comprising:
receiving first data to be stored to a first data storage medium;
storing the first data to a first storage location in a nonvolatile data store of a second data storage medium comprising a solid-state memory;
setting a write pointer to direct writing second data that is received to a next sequential storage location in the nonvolatile data store, the next sequential storage location comprising an address of the nonvolatile data store that is sequentially after an address of the first storage location, wherein when the address of the first storage location is a last address location of the nonvolatile data store, the write pointer is set to enable writing the second data to a first addressed location of the nonvolatile data store;
writing the first data stored in the nonvolatile data store to the first data storage medium when a trigger occurs; and
preserving the write pointer during the writing from the nonvolatile data store to the first data storage medium such that the write pointer enables writing the second data to the next sequential storage location.

2. The method of claim 1, wherein the trigger comprises an indication of a quantity of data stored in the nonvolatile data store.

3. The method of claim 1, wherein the trigger comprises an indication that the write pointer is set to a specific address.

4. The method of claim 1, wherein the trigger comprises an indication of a length of time from a previous writing of the nonvolatile data store to the first data storage medium.

5. The method of claim 1, wherein writing the first data stored in the nonvolatile data store comprises flushing the data stored in the nonvolatile data store to the first data storage medium.

6. The method of claim 5, wherein flushing the data comprises:
   retrieving the data from the nonvolatile data store;
   sorting the data based on logical block addresses associated with the data; and
   storing the sorted data to the first data storage medium based on the logical block addresses.

7. The method of claim 5, wherein flushing the data comprises accessing a translation component to map physical block addresses of the data to corresponding logical block addresses and erasing the data from the nonvolatile data store after the sorted data has been stored to the first data storage medium.

8. The method of claim 7, wherein the translation component comprises a tree structure having a plurality of nodes, each of the plurality of nodes representing information including a logical address, a physical address, and a number of sectors associated with data stored in the nonvolatile data store.

9. The method of claim 1, further comprising storing the write pointer in the nonvolatile data store.

10. The method of claim 1, wherein writing the first data comprises writing the first data to a user data region of the nonvolatile data store and writing a logical block address identifier associated with the first data to a spare region of the nonvolatile data store.

11. The method of claim 1, and further comprising:
   receiving a request to access data;
   determining whether at least a portion of the requested data is stored in the nonvolatile data store; and
   accessing the requested data based on the step of determining.

12. The method of claim 11, wherein the step of accessing comprises:
   if only a portion of the requested data is stored in the nonvolatile data store, then
      flushing the portion of the requested data from the nonvolatile data store to the first data storage medium, and
      accessing the requested data, including the portion flushed from the nonvolatile data store, from the first data storage medium.

13. A controller for a data storage system, the controller comprising:
   a first interface for writing data to a first data storage device;
   a second interface for writing data to a second data storage device comprising a solid-state nonvolatile data store;
   a wear-leveling component configured to store a first portion of data to a first storage location in the nonvolatile data store and set a pointer to enable writing a second portion of data to a next storage location in the nonvolatile data store, the next storage location comprising an address of the nonvolatile data store that is sequentially after an address of the first storage location, wherein when the address of the first storage location is a last addressed location of the nonvolatile data store, the pointer is set to enable writing the second data to a first addressed location of the nonvolatile data store, and wherein the wear-leveling component is configured to flush the first portion of data stored in the nonvolatile data store to the first data storage device when a trigger occurs and preserve the pointer during the flush from the nonvolatile data store to the first data storage device such that the pointer enables writing the second data to the next storage location.

14. The controller of claim 13, wherein the trigger comprises at least one of an indication of a quantity of data stored in the nonvolatile data store, an indication that the pointer is set to a specific address, and an indication of a length of time from a previous writing of the nonvolatile data store to the first data storage device medium.

15. A data storage system comprising:
   a data storage medium;
   a non-volatile data store comprising solid-state memory having a plurality of storage locations addressed as a circular buffer; and
   a controller configured to write data to sequential addresses in the circular buffer, wherein the controller stores a first portion of data to a first storage location in the circular buffer and sets a pointer to enable writing a second portion of data that is received to a next storage location in the circular buffer, and wherein the controller determines if an amount of data stored in the circular buffer is above a threshold and, in response, flushes the amount of data from a set of storage locations in the circular buffer, the controller preserving the pointer when the amount of data is flushed such that a next portion of data is stored to addresses in the circular buffer that are sequentially after the set of storage locations from which the amount of data was flushed.

16. The data storage system of claim 15, wherein the controller comprises a wear leveling component that is integrated with one or more of the non-volatile data store and a file system associated with the data storage system.

17. The data storage system of claim 16, wherein the wear leveling component is further configured to flush the amount of data from the non-volatile data store by retrieving the data from the circular buffer, sorting the data based on logical block addresses associated with the data, and storing the sorted data to the data storage medium based on the logical block addresses.

18. The data storage medium of claim 16, wherein the non-volatile data store comprises flash memory and the wear leveling component is integrated in a flash memory controller associated with the flash memory, and wherein the flash memory controller includes a flash translation layer having translation information for mapping logical addresses of data stored in the circular buffer with the corresponding physical addresses of the storage locations in the circular buffer where the data is stored.

19. The data storage system of claim 18, wherein the translation information comprises a B-tree structure having a plurality of nodes, each of the plurality of nodes including mapping information representing a portion of data stored in the circular buffer, the mapping information comprising:
   a logical address associated with the portion of data;
   a physical address identifying a location in the circular buffer where the portion of data is stored;
   a size of the portion of data; and
   at least one pointer that identifies a child node.

20. The data storage system of claim 16, wherein the wear leveling component is configured to receive a portion of data to be written to the data storage medium, determine whether the portion of data includes an amount of data above a threshold, and store the portion of data to sequential addresses in the circular buffer if the amount of data is below the threshold, wherein the portion of data is stored directly to the data storage medium if the amount of data is above the threshold.

* * * * *